(12) United States Patent
Leibovitz et al.

(10) Patent No.: US 10,223,586 B1
(45) Date of Patent: Mar. 5, 2019

(54) MULTI-MODAL ELECTRONIC DOCUMENT CLASSIFICATION

(71) Applicant: COGNIGO RESEARCH LTD.

(72) Inventors: Guy Leibovitz, Tel Aviv (IL); Adam Bali, Tel Aviv (IL)

(73) Assignee: COGNIGO RESEARCH LTD., Tel Aviv (IL)

( * ) Notice: Subject to any disclaimer, the term of this patent is extended or adjusted under 35 U.S.C. 154(b) by 0 days.

(21) Appl. No.: 16/037,194

(22) Filed: Jul. 17, 2018

Related U.S. Application Data

(60) Provisional application No. 62/698,168, filed on Jul. 15, 2018.

(51) Int. Cl.
  *G06K 9/62* (2006.01)
  *G06K 9/00* (2006.01)
  *G06K 9/46* (2006.01)
  *G06N 3/08* (2006.01)

(52) U.S. Cl.
  CPC ..... *G06K 9/00456* (2013.01); *G06K 9/00469* (2013.01); *G06K 9/4676* (2013.01); *G06K 9/6256* (2013.01); *G06K 9/6267* (2013.01); *G06N 3/08* (2013.01); *G06K 2209/01* (2013.01)

(58) Field of Classification Search
  None
  See application file for complete search history.

(56) References Cited

U.S. PATENT DOCUMENTS

| 2001/0042085 | A1* | 11/2001 | Peairs | G06F 17/30253 715/200 |
| 2016/0364419 | A1* | 12/2016 | Stanton | G06F 17/3002 |
| 2017/0150235 | A1 | 5/2017 | Mei et al. | |

OTHER PUBLICATIONS

Pengfei Liu et al., "Recurrent Neural Network for Text Classification with Multi-Task Learning", IJCAI'16 Proceedings of the Twenty-Fifth International Joint Conference on Artificial Intelligence, Jul. 2016, pp. 2873-2879.
Fei Yan et al, "Deep correlation for matching images and text", 2015 IEEE Conference on Computer Vision and Pattern Recognition (CVPR), Jun. 2015, pp. 3441-3450.
Jean-Luc Bloechle, "Physical and Logical Structure Recognition of PDF Documents", Faculty of Science of the University of Fribourg, 2010.
Jiang Wang et al, "CNN-RNN: A Unified Framework for Multi-label Image Classification", CNN-RNN: A Unified Framework for Multi-label Image Classification, 2016, pp. 2285-2294.
Yu Liu et al, "Learning a Recurrent Residual Fusion Network for Multimodal Matching", IEEE International Conference on Computer Vision (ICCV), 2017, pp. 4107-4116.
(Continued)

*Primary Examiner* — Sean M Conner
(74) *Attorney, Agent, or Firm* — The Roy Gross Law Firm, LLC; Roy Gross

(57) ABSTRACT

A method comprising operating at least one hardware processor for: receiving, as input, a plurality of electronic documents, training a machine learning classifier based, at least on part, on a training set comprising: (i) labels associated with the electronic documents, (ii) raw text from each of said plurality of electronic documents, and (iii) a rasterized version of each of said plurality of electronic documents, and applying said machine learning classifier to classify one or more new electronic documents.

12 Claims, 7 Drawing Sheets

(56) References Cited

OTHER PUBLICATIONS

Yuhua Jia et al, "Deep Convolutional Neural Network for Correlating Images and Sentences", International Conference on Multimedia Modeling, 2018, pp. 154-165.

Lin Ma et al, "Multimodal Convolutional Neural Networks for Matching Image and Sentence", IEEE International Conference on Computer Vision (ICCV), 2015, pp. 1-11.

Chih-Kuan Yeh et al, "Learning Deep Latent Spaces for Multi-Label Classification", Association for the Advancement of Artificial Intelligence, 2017.

Jifei Song et al, "Fine-Grained Image Retrieval: the Text/Sketch Input Dilemma", The British Machine Vision Conference, 2017.

Sarath Chandar et al, "Correlational Neural Networks", Neural Computation, Feb. 2016.

Tanmoy Mukherjee et al, "Deep Matching Autoencoders", ArXiv, 2017.

\* cited by examiner

MULTI-MODAL ELECTRONIC DOCUMENT CLASSIFICATION

CROSS-REFERENCE TO RELATED APPLICATIONS

This application claims the benefit of priority to U.S. Provisional Patent Application No. 62/698,168, filed Jul. 15, 2018, and entitled "Multi-Modal Electronic Document Classification".

BACKGROUND

The invention relates to the field of machine learning.

Multi-modal representation of data may be beneficial in several machine learning tasks, such as image captioning, visual question answering, multi-lingual data retrieval, and electronic document classification. This is because, in many instances, an amalgamation of multiple views of an input sample is likely to capture more meaningful information than a representation that accounts for only a single modality. For example, in the task of scene recognition in a video, video data generally is comprised of video frames (images) along with audio. Images and audio thus comprise two different representations of the same input sample, each with different representative features. By combining these two modalities into a common subspace, classification of abstract scenes from the video can become more accurate.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, method comprising operating at least one hardware processor for: receiving, as input, a plurality of electronic documents, training a machine learning classifier based, at least on part, on a training set comprising: (i) labels associated with the electronic documents, (ii) raw text from each of said plurality of electronic documents, and (iii) a rasterized version of each of said plurality of electronic documents, and applying said machine learning classifier to classify one or more new electronic documents.

There is also provided, in accordance with an embodiment, a system comprising at least one hardware processor; and a non-transitory computer-readable storage medium having stored thereon program instructions, the program instructions executable by the at least one hardware processor to: receive, as input, a plurality of electronic documents, train a machine learning classifier based, at least on part, on a training set comprising: (i) labels associated with the electronic documents, (ii) raw text from each of said plurality of electronic documents, and (iii) a rasterized version of each of said plurality of electronic documents, and apply said machine learning classifier to classify one or more new electronic documents.

There is further provided, in accordance with an embodiment, a computer program product comprising a non-transitory computer-readable storage medium having program instructions embodied therewith, the program instructions executable by at least one hardware processor to: receive, as input, a plurality of electronic documents, train a machine learning classifier based, at least on part, on a training set comprising: (i) labels associated with the electronic documents, (ii) raw text from each of said plurality of electronic documents, and (iii) a rasterized version of each of said plurality of electronic documents, and apply said machine learning classifier to classify one or more new electronic documents.

In some embodiments, said labels denote document categories.

In some embodiments, the method further comprises, and in the case of the system and computer program product, the instructions further comprise, with respect to each of said plurality of sample electronic documents, applying one or more neural networks (i) to said extracted text, to generate a data representation of said extracted text as a fixed length vector; and (ii) to said image, to generate a data representation of said image which corresponds to a visual layout of said sample electronic document.

In some embodiments, said one or more neural networks are selected from the group consisting of: Neural Bag-of-Words (NBOW), recurrent neural network (RNN), Recursive Neural Tensor Network (RNTN), Convolutional neural network (CNN), Dynamic Convolutional Neural Network (DCNN), Long short-term memory network (LSTM), and recursive neural network (RecNN).

In some embodiments, said one or more neural networks comprise one or more hidden layers.

In some embodiments, the method further comprises, and in the case of the system and computer program product, the instructions further comprise, calculating a correlation between (i) said data representation of said extracted text, and (ii) said data representation of said image.

In some embodiments, the method further comprises, and in the case of the system and computer program product, the instructions further comprise, generating, with respect to each of said plurality of electronic documents, a combined data representation based, at least in part, on (i) said data representation of said extracted text, (ii) said data representation of said image, and (iii) said correlation.

In some embodiments, said generating is based, at least in part, on a cost function which: (i) minimizes an error of reconstructing said extracted text from said data representation of said extracted text, and said image from said data representation of said image; (ii) minimizes an error of cross-reconstructing said extracted text from said data representation of said image and said image from said data representation of said extracted; and (iii) maximizes said correlation between said data representation of said extracted text, and said data representation of said image.

In some embodiments, said combined data representation is provided as a training input to said machine classifier.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 1A-1B illustrate a raster image of a document and raw text extracted therefrom;

DETAILED DESCRIPTION

Figure 2C:
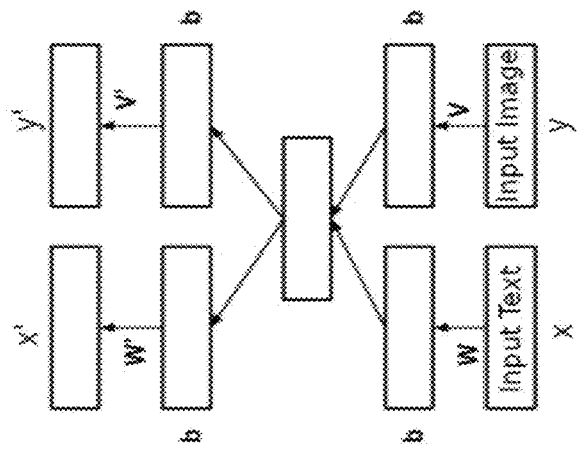
FIGS. 2A-2C schematically illustrate a process for the creation of a fusion representation of an electronic document, according to an embodiment.

Disclosed herein are a method, system, and computer program product for training a machine learning classifier to classify electronic documents based on a multi-modal training model. In some embodiments, the training model is based on at least two modalities: the raw textual content of the electronic documents, and the visual structure of the electronic documents (which may, in turn, include at least one of text styling and non-textual graphics such as illustrations and photos).

As used herein, the term "electronic document" refers broadly to any document containing mainly text and stored in a computer-readable format. Electronic document formats may include, among others, Portable Document Format (PDF), Digital Visual Interface (DVI), PostScript, word processing file formats, such as docx, doc, and Rich Text Format (RTF), and/or XML Paper Specification (XPS).

Document classification is a known task in the field of information retrieval and machine learning, and it plays an important role in a variety of applications. Embodiments of the present invention may contribute to enterprise content management, by ensuring that enterprise documents are stored in a logical, organized way that makes it easy to retrieve the information quickly and efficiently. An automatic document classification tool according to some embodiments can thus realize a significant reduction in manual entry costs, and improve the speed and turnaround time for document processing. Such tools may be especially useful for publishers, financial institutions, insurance companies, and/or any industry that deals with large amounts of content.

In some embodiments, the present invention may be configured for automatic document classification based, at least in part, on content-based assignment of one or more predefined categories (classes) to documents. By classifying the content of a document, it may be assigned one or more predefined classes or categories, thus making it easier to manage and sort.

Typically, multi-class machine learning classifiers are trained on a training set of documents, where each document belongs to one of a certain number of distinct classes (e.g., invoices, scientific papers, resumes, letters). The training set may be labeled with the correct classes (e.g., for supervised learning), or may not be labeled (e.g., in the case of unsupervised learning). Following a training stage, the classifier may be able to predict the most probable class for each document in a test set of documents. Although document classification may be based on textual content alone, for some types of documents, the task of classification can be significantly enhanced by also generating features from the visual structure of the document. This is based on the idea that documents in the same category often also share similar layout and structure features.

Accordingly, in some embodiments, the present invention provides for training a multi-modal machine learning classifier on a training set comprising a plurality of electronic documents, each represented by (i) its textual content (i.e., raw text), and (ii) a raster image thereof. In some cases, an electronic document in the training set may only include one representation of the two. In such cases, a preprocessing stage may be necessary to generate the second representation from the first. For example, a raster image of a document may be created using a suitable application, or raw text may be extracted from a raster image using, e.g., optical character recognition (OCR). FIG. 1, in panel A, illustrates an exemplary raster image of an electronic document. In panel B, raw text has been extracted from the raster image using, e.g., OCR. In some cases, the preprocessing stage may further include scanning hard copies of documents to generate a raster image, from which raw text may then be extracted using OCR.

In some embodiments, following a multi-modal training stage, a trained classifier of the present invention may be configured for classifying electronic documents based on a multi-modal input comprising both representations of the documents. In other embodiments, the trained classifier may be configured for classifying electronic documents based on only a single modality input (e.g., textual content or raster image alone), with improved classification accuracy as compared to a classifier which has been trained solely based on a single modality.

In some embodiments, the present invention may employ one or more types of neural networks to further generate data representations of the multi-modal inputs. For example, raw input text from an electronic document may be processed so as to generate a data representation of the text as a fixed-length vector. Similarly, images of the electronic document (e.g., thumbnails or raster images) may be processed to extract image features.

In some embodiments, the neural network models employed by the present invention to generate textual data representations may be selected from the group consisting of Neural Bag-of-Words (NBOW); recurrent neural network (RNN), Recursive Neural Tensor Network (RNTN); Dynamic Convolutional Neural Network (DCNN); Long short-term memory network (LSTM); and recursive neural network (RecNN). See, e.g., Pengfei Liu et al., "Recurrent Neural Network for Text Classification with Multi-Task Learning", Proceedings of the Twenty-Fifth International Joint Conference on Artificial Intelligence (IJCAI-16). Convolutional neural network (CNN) may be used, e.g., to extract image features which represent the physical visual structure of a document.

In some embodiments, the present invention may further be configured for employing a common representation learning (CRL) framework, for learning a common representation of the two views of data (i.e., textual and visual). CRL is associated with multi-view data that can be represented in multiple forms. The learned common representation can then be used to train a model to reconstruct all the views of the data from each input. CRL of multi-view data can be categorized into two main categories: canonical-based approaches and autoencoder-based methods. Canonical Correlation Analysis (CCA)-based approaches comprise learning a joint representation by maximizing correlation of the views when projected to the common subspace. Autoencoder (AE) methods learn a common representation by minimizing the error of reconstructing the two views. AE-based approaches use deep neural networks that try to optimize two objective functions. The first objective is to find a compressed hidden representation of data in a low-dimensional vector space. The other objective is to reconstruct the original data from the compressed low-dimensional subspace. Multi-modal autoencoders (MAE) are twochanneled models which specifically perform two types of reconstructions. The first is the self-reconstruction of view from itself, and the other is the cross-reconstruction where each view is reconstructed from the other. These reconstruction objectives provide MAE the ability to adapt towards transfer learning tasks as well. In the context of CRL, each of these approaches has its own advantages and disadvantages. For example, though CCA based approaches outperform AE based approaches for the task of transfer learning, they are not as scalable as the latter.

Accordingly, in some embodiments, the present invention may combine elements of both CCA and AE. In some embodiments, given data representations of both textual and visual structure data representations of an electronic document, the present invention may be configured for training a neural network to maximize reconstruction and cross-reconstruction abilities of both input sources, based, at least in part, on an autoencoder framework. The present invention may then provide for extracting a correlation between the two representations using, e.g., a DCCA (deep CCA) paradigm, in order to create a fusion representation which may optimally summarize both the textual content and the visual structure data contained in the input electronic document. In some embodiments, the fusion representation of the present model may further be applied as a direct input in an electronic document classification model.

In some embodiments, A Correlation Neural Networks (CorrNet) may be trained on maximizing a reconstruction ability with respect to each representation, as well as maximizing the correlation between the two representations, thus producing a fusion representation of the document, which may be then used for enhanced classification purposes. In addition, in some embodiments, once the CorrNet classification model has been trained on both representations, an enhanced classification prediction may then be achieved using only a single input source. In other words, the multi-modal trained classification model may allow for textual content to be sufficient on its own as an input, to generate improved classification accuracy, as compared to a model which has been trained solely based on textual input.

Figure 2B:
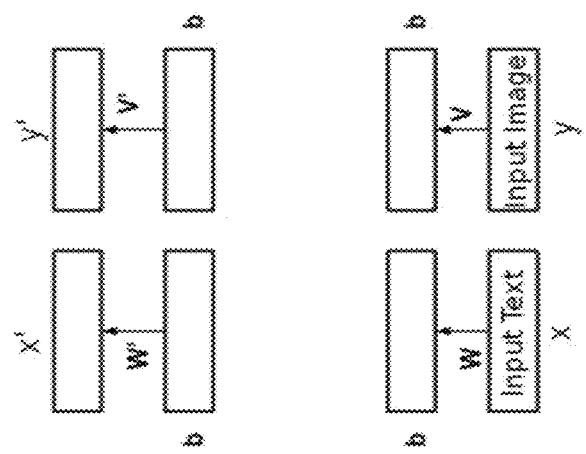
Figure 2A:
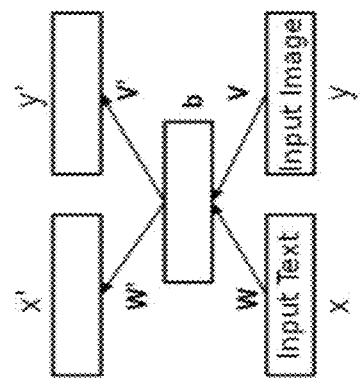

FIG. 2 schematically illustrates a process for the creation of a fusion representation of an electronic document, according to an embodiment. In some embodiments, given a space $$z=(x,y),$$

where x and y are a raw text and image inputs, respectively, of a sample electronic document, a correlational neural model of the present invention may be configured, at a step A, to create a compressed multi-modal representation as follows:

$$h(z)=f(Wx+Vy+b),$$

where W, V are projection matrices, and b is a bias vector.

An output layer of the model may then aim to generate z', which is a reconstruction of z, from the hidden representations of x, y as follows:

$$Z'=g([W'h(z),V'h(z)]+b'),$$

where W, V' are reconstruction matrices and b' is a bias vector.

In some embodiments, the present invention may thus be configured for training a correlational neural network to classify samples comprising both textual ($x_i$) and visual ($y_i$) content, based on a cost function which, with respect to each sample in the given training set ($x_i,y_i$), attempts to:

Minimize the self-reconstruction error ($L_1$), which is equal to the errors in reconstructing $x_i$ from $x_i$ and $y_i$ from $y_i$;

minimize the cross-reconstruction errors ($L_2$, $L_3$), which are equal to the errors in reconstructing $x_i$ from $y_i$ and $y_i$ from $x_i$; and maximize the correlation ($L_4$) between the representations of both views.

In some embodiments, using a regularization hyper-parameter λ for scaling the offset of the correlation, the cost function employed by the present model may be defined as:

$$J_z(\theta) = \sum_{i=1}^{N} (L(z_i, g(h(z_i))) + L(z_i, g(h(x_i))) + L(z_i, g(h(y_i))) - \lambda \text{corr}(h(X), h(Y)),$$

where (i) $L(z_i, g(h(z_i))$ is the self-reconstruction error $L_1$; (ii) $L(z_i, g(h(x_i)))$ and $L(z_i, g(h(y_i)))$ are the cross-reconstruction errors $L_2$, $L_3$; and (iii) λ corr(h(X), h(Y)) is the correlation $L_4$. In some embodiments, the correlation $L_4$ between the two representations of the views may be computed as:

$$\text{corr}(h(X), h(Y)) = \frac{\sum_{i=1}^{N} (h(x_i) - \overline{h(X)})(h(y_i) - \overline{h(Y)})}{\sqrt{\sum_{i=1}^{N} (h(x_i) - \overline{h(X)})^2 \sum_{i=1}^{N} (h(y_i) - \overline{h(Y)})^2}}$$

The above process can be further repeated to obtain a deeper neural architecture, with hidden layers added to both the encoding and the decoding phases, e.g., as shown at B and C in FIG. 2. Once the correlational neural model has been trained on the training set, the correlational representation achieved in the middle layer of the network can then be utilized for the classification task.

Accordingly, in some embodiments, the classification model of the present invention may be configured for unsupervised training, solely based on document data points consisting of textual content and visual content, absent any training labels. In other embodiments, a variation of the classification model described above may comprise at least a partially-labelled training set. In such embodiments, the classification model may incorporate the classification ability of the generated representation directly in the loss function, and create additional fully connected layers on top of the representation inside the correlational model, ending with a softmax activation layer to categorize each representation to its corresponding predicted class.

In some embodiments, the present invention comprises one or more types of AE neural networks, wherein each type of AE may be best suited for a different type of representation encoding/decoding task. For example, a CNN may be used for creating representations of visual structure input, and an RNN or LSTM may be used for textual inputs.

Figure 3A:
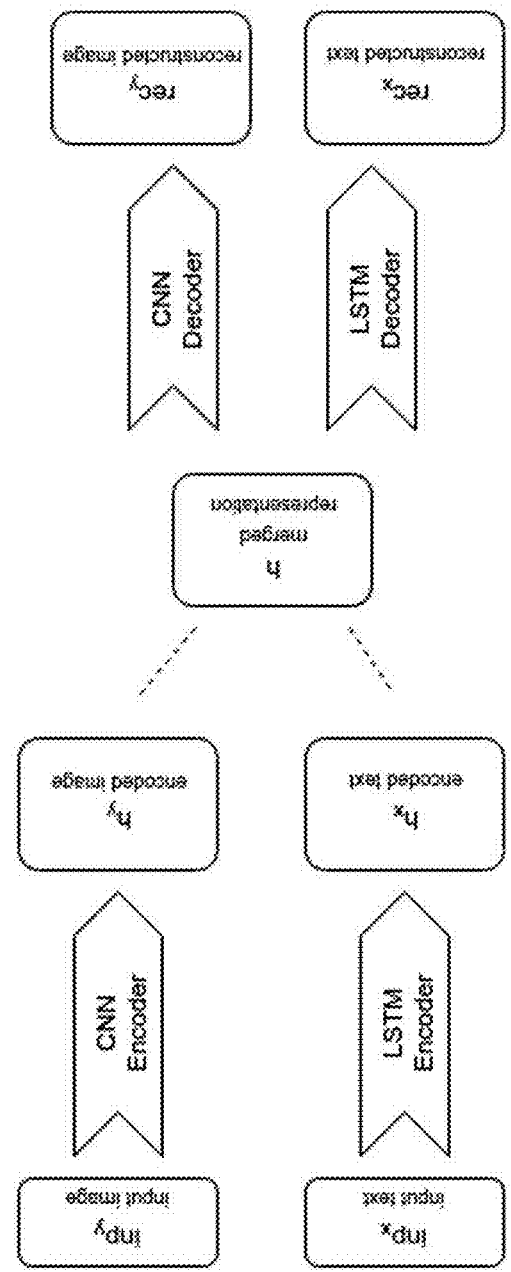
FIGS. 3A-3D illustrate various multi-modal classification models, according to an embodiment.

FIG. 3A schematically illustrates a 'branch' classification model according to an embodiment, which comprises two types of encoders: a LSTM for textual input (x), and a CNN for visual structure input (y). As can be seen, both inputs are encoded into fixed-sized vector representations, which are then fused into a single mutual representation (e.g., a 'merged' layer in the middle), from which the model is able to decode both visual and text inputs separately.

Figure 3B:
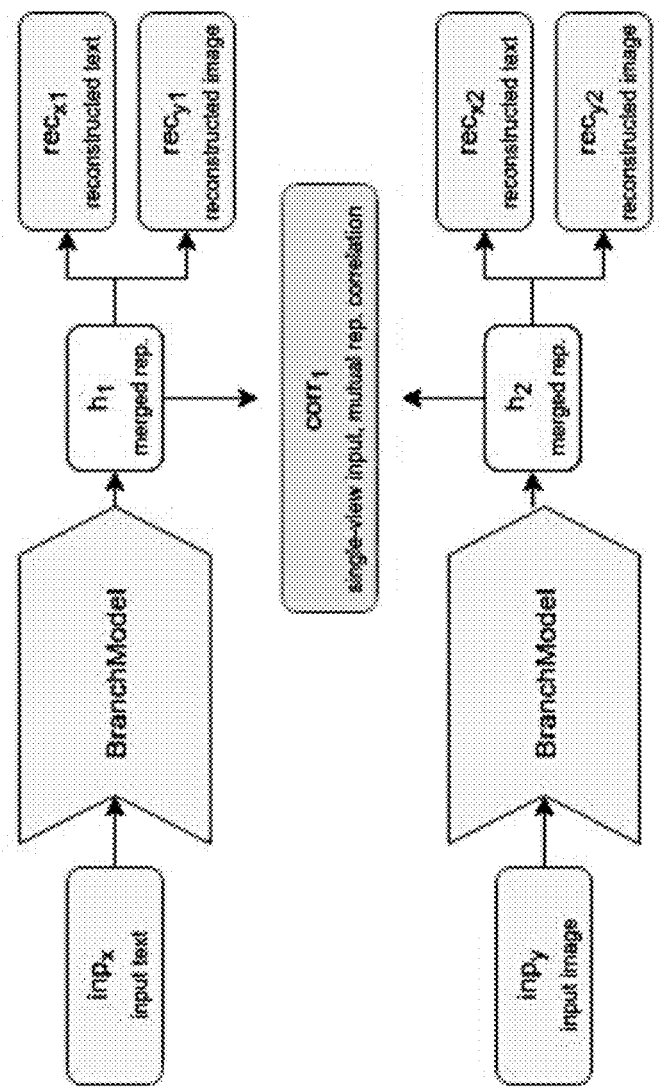
Figure 3C:
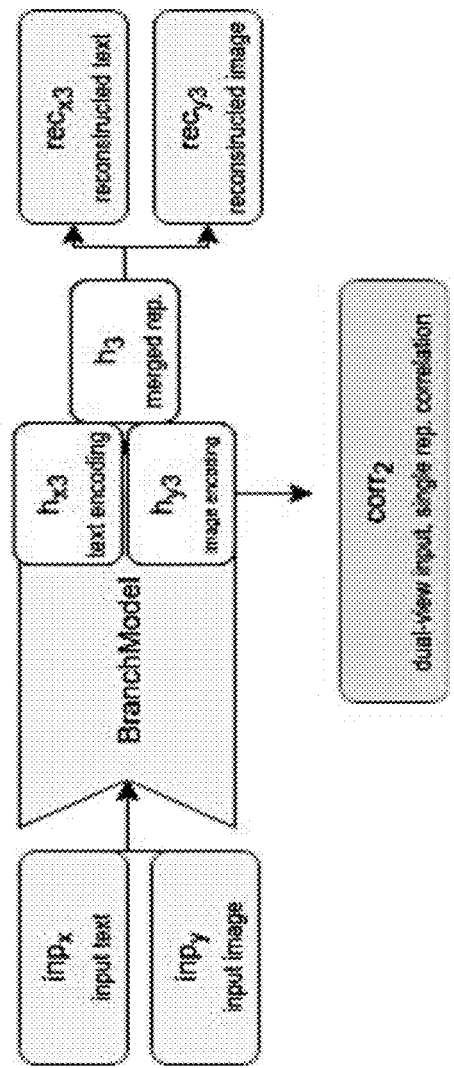

FIGS. 3B-3C schematically illustrate a CorrNet classification model according to an embodiment of the present invention. The CorrNet model comprises calls to the 'branch' model described above with respect to FIG. 3A, in order to calculate the loss functions following the reconstruction processes described above. The loss functions consider the difference between the original inputs and the reconstructed outputs, offset by the correlations calculated in the process. In other words, the model is penalized for either creating a reconstruction too different from the original input, or obtaining a reconstruction using uncorrelated representations between the two views. During training, for each input type, the CorrNet model reconstructs all the relevant views from either dual-view or single-view contained in the input, and evaluates the loss functions accordingly. In some embodiments, the correlation between the two representations of a sample can be computed at different layers of representations, by calling the 'branch' model. Specifically, the term $L_4$ noted above may be expanded into the sum of the following two calculated types of correlations:

Correlation of the mutual representation between the two embeddings achieved when training the model on two separate single-view inputs; and correlation of the single-view representation achieved before merging, when training the model on a dual-view input.

In some embodiments, during training, the loss functions described above is assigned weights, to direct the learning process towards the goals in a balanced manner.

Figure 3D:
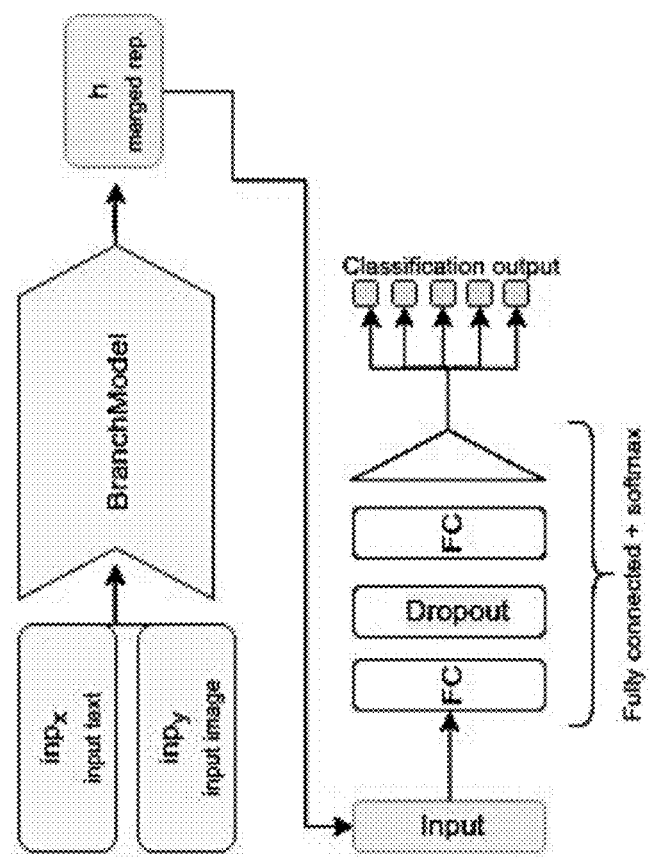

Finally, FIG. 3D schematically illustrates yet another variation of the classification model, according to an embodiment, where the middle layer achieved in the 'branch' model described above is used as direct input for the classification model.

Figure 4:
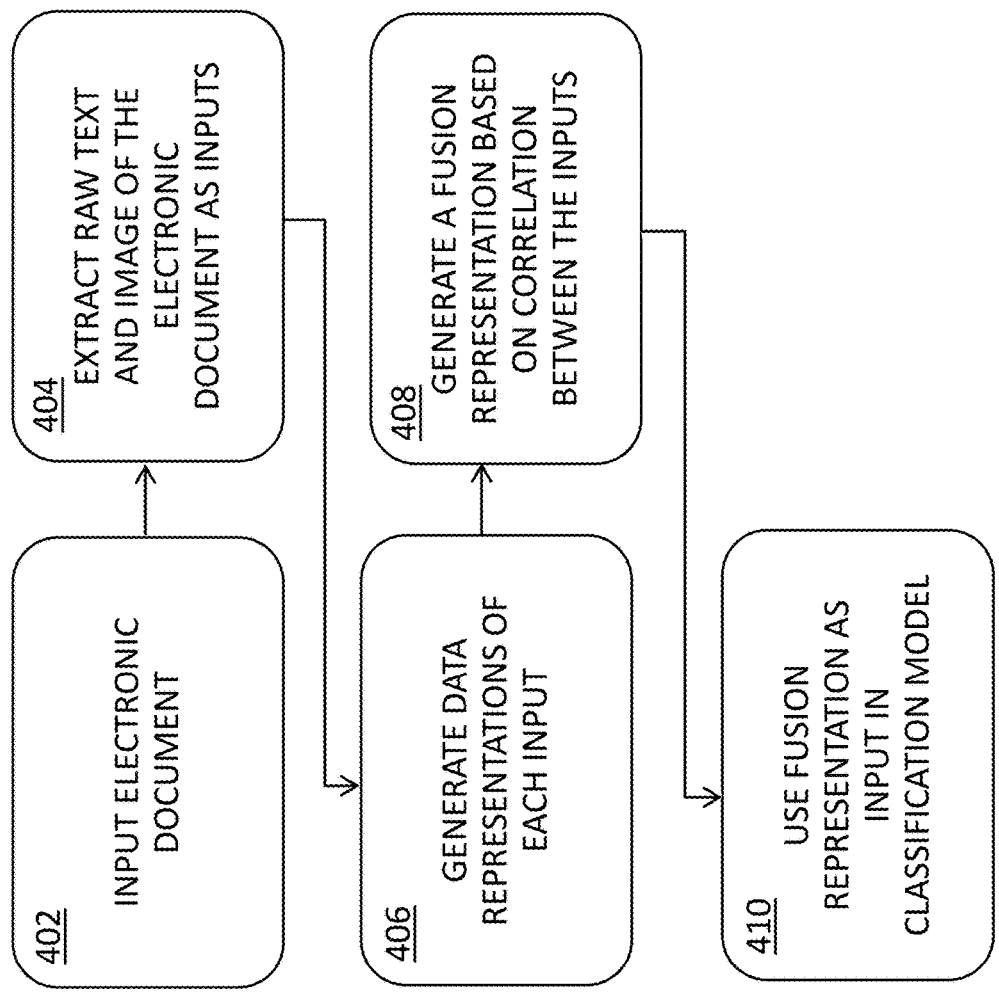
FIG. 4 is a flowchart of the functional steps in a method for training a multi modal classifier, according to an embodiment.

FIG. 4 is a flowchart of the functional steps in a method for training a multi modal classifier, according to an embodiment. At 402, a sample electronic document is used as input with respect to a correlational neural model of the present invention. At 404, raw text and a raster image of the sample document are extracted. At 406, textual and visual data representations of the raw text and the image are generated. At 408, a common fusion representation is generated base on the textual data representation, the visual data representation, and the correlation therebetween. Finally, at 410, the fusion representation is used a direct input in a document classifier.

Experimental Results

The present correlational neural model was tested on a training set of labeled sample electronic documents from open and private sources, including over 500 documents from the following different categories (the numbers in parenthesis represent the number of samples from each category):

Resumes (227);
invoices (154);
quarterly financial reports (50);
non-disclosure agreements (47); and
scientific papers (47).

For each sample, the raw text was extracted to be used as textual input, and a raster image was generated to be used as visual input. For experimental purposes, the data was randomly split into training and testing sets by a ratio of 2 to 1, respectively. All models were trained solely on the train set (containing two-thirds of the data), and their predictive abilities were tested on the previously unseen test set.

For the purpose of examining the proposed classification method, the following models were employed:

Branch-Model: Dual auto-encoder part of the network, as illustrated with respect to FIG. 3A. This model encodes the multi-modal view of each electronic document into a fixed-size embedding vector.

Correlational Network: This model runs multiple sessions of the branch model described above, each time with the relevant input containing one or more of the views, to calculate the relevant loss functions as well as the correlations between the relevant views.

Classification model: This model receives as input the embedding vectors from the correlational network, and returns a predicted class of an input electronic document.

For comparison purposes, two reference single-modal models were employed, each with respect to one of the modalities used in the present multi-modal model (i.e., either text or image). Each of the single-modality models was based on the corresponding part in the CorrNet architecture, and comprises the same number of layers with the same values of hyper-parameters and activation layers. This was done to ensure the isolation the effect of the architecture and the definition of the loss functions from other factors.

Additionally, the correlational model was tested with respect to its ability to learn a dual-view correlated mapping of both modalities (text and image) given just a single modality as input, as follows:

Self-reconstruction: Ability to reconstruct a single view, given the same view as input.

Cross-reconstruction: Ability to reconstruct a single view, given the other view as input (i.e., image from text and vice-versa).

For the task of document classification, accuracy was tested with respect to the following classification tasks:

Single-view classification: Classification accuracy given a single original view as input (either text or image).

Single-view, cross-reconstructed classification: Classification accuracy given a single reconstructed view as input (either text reconstructed from original image or vice versa).

Multi-modal classification: Classification accuracy given both input modalities (text and image).

Multi-modal, cross-reconstructed-views classification: Classification accuracy given multi-modal reconstructions of the original input (each modality reconstructed by the model separately, and the concatenation of both reconstructed views given as input).

Multi-modal, semi-reconstructed views classification: Classification accuracy given multi-modal semi-reconstructed input (a concatenation of the original text with the reconstruction of the image from the text, and vice versa).

Table 1 below provides test results for each of the above-referenced classification tasks, where:

Precision (also called positive predictive value) refers to the number of correct positive results divided by the number of all positive results returned;

Recall (also known as sensitivity) refers to the number of correct positive results divided by the number of all relevant samples; and F1 score refers to overall accuracy, based on the harmonic average of both the precision and the recall scores.

TABLE 1

Test Results

| Method | Precision | Recall | F1 Score |
| --- | --- | --- | --- |
| Single view - Text | 0.89 | 0.88 | 0.88 |
| Single view - Image | 0.75 | 0.75 | 0.74 |
| Single view - Reconstructed Text | 0.70 | 0.70 | 0.69 |
| Single view - Reconstructed Image | 0.83 | 0.83 | 0.82 |
| Multi-Modal View - Text + Image | 0.91 | 0.90 | 0.89 |
| Multi-Modal View - Reconstructed Text, Reconstructed Image | 0.86 | 0.85 | 0.85 |
| Multi-Modal View - Reconstructed Text, Image | 0.72 | 0.72 | 0.72 |
| Multi-Modal View - Text, Reconstructed Image | 0.91 | 0.91 | 0.90 |
| Reference Model - Text Only | 0.88 | 0.88 | 0.87 |
| Reference Model - Image | 0.74 | 0.70 | 0.71 |

The values given in table 1 suggest that the multi-modal model of the present invention is capable of generating a representation useful for a classification that outperforms classifications based on representations generated by similar approaches. Given two inputs, even if one of the inputs is a reconstruction, a fruitful representation can be achieved. Accordingly, the present model allows for effective document classification, by utilizing the multi-view correlation to maximize the abundant information prevailing not just in the textual content but also in the visual structure. Once the CorrNet architecture is trained on existing dual-view inputs, a single view is sufficient to obtain an amplified representation ready for classification.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    operating at least one hardware processor for:
        receiving, as input, a plurality of electronic documents;
        applying, with respect to each of said plurality of electronic documents, one or more neural networks:
        (i) to raw text extracted from the respective electronic document, to generate a data representation of said raw text as a fixed length vector, and
        (ii) to a rasterized version of the respective electronic document, to generate a data representation of said rasterized version which corresponds to a visual layout of the respective electronic document;
        calculating, with respect to each of said plurality of electronic documents, a correlation between said data representation of said raw text and said data representation of said rasterized version;
        generating, with respect to each of said plurality of electronic documents, a combined data representation based, at least in part, on: said data representation of said raw text, said data representation of said rasterized version, and said correlation,
        wherein said generating is based, at least in part, on a cost function which:
        (i) minimizes an error of reconstructing said raw text from said data representation of said raw text, and said rasterized version from said data representation of said rasterized version,
        (ii) minimizes an error of cross-reconstructing said raw text from said data representation of said rasterized version, and said rasterized version from said data representation of said raw text, and
        (iii) maximizes said correlation between said data representation of said raw text and said data representation of said rasterized version;
        training a machine learning classifier based, at least in part, on a training set comprising:
        (i) labels associated with said plurality of electronic documents,
        (ii) said combined data representations; and
        applying said machine learning classifier to classify one or more new electronic documents.

2. The method of claim 1, wherein the labels denote document categories.

3. The method of claim 1, wherein said one or more neural networks are selected from the group consisting of: Neural Bag-of-Words (NBOW), recurrent neural network (RNN), Recursive Neural Tensor Network (RNTN), Convolutional neural network (CNN), Dynamic Convolutional Neural Network (DCNN), Long short-term memory network (LSTM), and recursive neural network (RecNN).

4. The method of claim 1, wherein said one or more neural networks comprise one or more hidden layers.

5. A system comprising:
    at least one hardware processor; and
    a non-transitory computer-readable storage medium having stored thereon program instructions, the program instructions executable by the at least one hardware processor to:
        receive, as input, a plurality of electronic documents,
        apply, with respect to each of said plurality of electronic documents, one or more neural networks:
        (i) to raw text extracted from the respective electronic document, to generate a data representation of said raw text as a fixed length vector, and
        (ii) to a rasterized version of the respective electronic document, to generate a data representation of said rasterized version which corresponds to a visual layout of the respective electronic document,
        calculate, with respect to each of said plurality of electronic documents, a correlation between said data representation of said raw text and said data representation of said rasterized version,
        generate, with respect to each of said plurality of electronic documents, a combined data representation based, at least in part, on: said data representation of said raw text, said data representation of said rasterized version, and said correlation,
        wherein the generating is based, at least in part, on a cost function which:
        (i) minimizes an error of reconstructing said raw text from said data representation of said raw text, and said rasterized version from said data representation of said rasterized version,
        (ii) minimizes an error of cross-reconstructing said raw text from said data representation of said rasterized version, and said rasterized version from said data representation of said raw text, and
        (iii) maximizes said correlation between said data representation of said raw text and said data representation of said rasterized version,
        train a machine learning classifier based, at least in part, on a training set comprising:
        (i) labels associated with said plurality of electronic documents,
        (ii) said combined data representations; and apply said machine learning classifier to classify one or more new electronic documents.

6. The system of claim 5, wherein the labels denote document categories.

7. The system of claim 5, wherein said one or more neural networks are selected from the group consisting of: Neural Bag-of-Words (NBOW), recurrent neural network (RNN), Recursive Neural Tensor Network (RNTN), Convolutional neural network (CNN), Dynamic Convolutional Neural Network (DCNN), Long short-term memory network (LSTM), and recursive neural network (RecNN).

8. The system of claim 5, wherein said one or more neural networks comprise one or more hidden layers.

9. A computer program product comprising a non-transitory computer-readable storage medium having program instructions embodied therewith, the program instructions executable by at least one hardware processor to:
   receive, as input, a plurality of electronic documents,
   apply, with respect to each of said plurality of electronic documents, one or more neural networks:
   (i) to raw text extracted from the respective electronic document, to generate a data representation of said raw text as a fixed length vector, and
   (ii) to a rasterized version of the respective electronic document, to generate a data representation of said rasterized version which corresponds to a visual layout of the respective electronic document,
   calculate, with respect to each of said plurality of electronic documents, a correlation between said data representation of said raw text and said data representation of said rasterized version,
   generate, with respect to each of said plurality of electronic documents, a combined data representation based, at least in part, on: said data representation of said raw text, said data representation of said rasterized version, and said correlation,
   wherein the generating is based, at least in part, on a cost function which:
   (i) minimizes an error of reconstructing said raw text from said data representation of said raw text, and said rasterized version from said data representation of said rasterized version,
   (ii) minimizes an error of cross-reconstructing said raw text from said data representation of said rasterized version, and said rasterized version from said data representation of said raw text, and
   (iii) maximizes said correlation between said data representation of said raw text and said data representation of said rasterized version,
   train a machine learning classifier based, at least in part, on a training set comprising:
   (i) labels associated with said plurality of electronic documents,
   (ii) said combined data representations; and
   apply said machine learning classifier to classify one or more new electronic documents.

10. The computer program product of claim 9, wherein the labels denote document categories.

11. The computer program product of claim 10, wherein said one or more neural networks are selected from the group consisting of: Neural Bag-of-Words (NBOW), recurrent neural network (RNN), Recursive Neural Tensor Network (RNTN), Convolutional neural network (CNN), Dynamic Convolutional Neural Network (DCNN), Long short-term memory network (LSTM), and recursive neural network (RecNN).

12. The computer program product of claim 10, wherein said one or more neural networks comprise one or more hidden layers.

* * * * *